United States Patent
Roesler (12)

(10) Patent No.: US 6,590,066 B1
(45) Date of Patent: Jul. 8, 2003

(54) IN-SITU PREPARATION OF POLYASPARTIC ESTER MIXTURE

(75) Inventor: Richard R. Roesler, Wexford, PA (US)

(73) Assignee: Bayer Corporation, Pittsburgh, PA (US)

( * ) Notice: Subject to any disclaimer, the term of this patent is extended or adjusted under 35 U.S.C. 154(b) by 0 days.

(21) Appl. No.: 10/031,629

(22) PCT Filed: Jul. 21, 2000

(86) PCT No.: PCT/US00/19808

§ 371 (c)(1),
(2), (4) Date: Jan. 15, 2002

(87) PCT Pub. No.: WO01/07504

PCT Pub. Date: Feb. 1, 2001

Related U.S. Application Data

(60) Provisional application No. 60/145,451, filed on Jul. 23, 1999.

(51) Int. Cl.⁷ ......................... C08G 69/10; C08G 69/26
(52) U.S. Cl. ...................... 528/328; 528/332; 528/335
(58) Field of Search ............................. 528/328, 332, 528/335

(56) References Cited

U.S. PATENT DOCUMENTS

| | | | |
|---|---|---|---|
| 5,236,741 A | 8/1993 | Zwiener et al. | 427/385.5 |
| 5,502,117 A | 3/1996 | Wood | 525/435 |
| 5,623,045 A | 4/1997 | Zwiener et al. | 528/68 |
| 5,807,968 A | 9/1998 | Heinrich et al. | 528/310 |

*Primary Examiner*—Duc Truong
(74) *Attorney, Agent, or Firm*—Joseph C. Gil; Thomas W. Roy

(57) ABSTRACT

A method for making a polyaspartic ester mixture in-situ comprising the sequential steps of (a) reacting a polypropylene oxide amine with an excess amount of an ester of fumaric or maleic acid to form a mixture containing first polyaspartic ester component and excess unreacted ester of fumaric or maleic acid, and (b) adding an acyclic amine to the mixture resulting from step (a) and reacting the acyclic amine with the excess ester of fumaric or maleic acid to form a second polyaspartic ester component.

16 Claims, No Drawings

IN-SITU PREPARATION OF POLYASPARTIC ESTER MIXTURE

This application claims the benefit of provisional application Ser. No. 60/145,451, filed Jul. 23, 1999.

FIELD OF THE INVENTION

The invention relates to a method for making polyaspartic esters.

BACKGROUND OF THE INVENTION

Two-component coating compositions having a polyisocyanate component and an isocyanate-reactive component (a polyhydroxyl component) are known. These compositions are suitable for the preparation of high quality coatings that may be rendered rigid, elastic, resistant to abrasion and to solvents and, above, all, resistant to weathering. Polyaspartic esters have been used as isocyanate-reactive components in such two-component compositions. A polyaspartic ester can be used individually, with a polyisocyanate, or possibly in combination with polyols or polyamines. Alternatively, polyaspartic esters can be used with blocked polyamines such as ketimines, aldimines or oxizolidines.

Methods for making polyaspartic esters are known. It is known, for instance, that during the Michael Addition Reaction of an ester of fumaric or maleic acid and the primary amine, for instance, the ester of maleic or fumaric acid isomerizes to dialkyl fumarate in the presence of amines, according to the following chemical reaction:

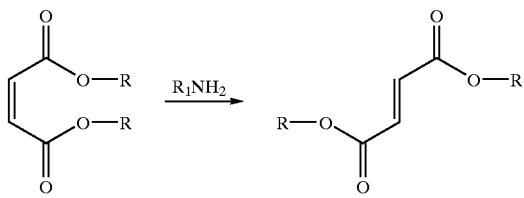

The dialkyl fumarate is then converted to a polyaspartic ester. Mixtures of polyaspartic esters based on cyclic and acyclic amines have proven to be valuable isocyanate-reactive components of polyurea compositions that have found utility in the formulation of high solids coatings where solvent content is very low or zero. These formulations are used in architectural and automotive refinish applications. Known methods for preparing polyaspartic ester mixtures typically involve preparing polyaspartic esters based on acyclic and polypropylene oxide amines separately and then combining each polyaspartic ester mixture. Polyaspartic esters based on acyclic amines, which contain amines attached to primary carbons, generally react with an isocyanate faster than polyaspartic esters based on polypropylene oxide amines that have an amine group attached to a secondary ring carbon. In addition, polyaspartic esters based on acyclic amines have a lower viscosity than polyaspartic esters based on polypropylene oxide amines. It is often desirable to blend these types of amines to achieve formulations with different viscosities and with intermediate reaction speeds.

U.S. Pat. No. 5,236,741 and U.S. Pat. No. 5,623,045 each disclose a single step process for the production of polyaspartic esters. Each process reacts an ester of maleic or fumaric acid with a primary polyamine such that preferably one olefinic double bond is present for each primary amino group. The patents teach that excess starting materials is removed by distillation after the reaction. Neither patent discusses how much time it takes for the reaction of the ester of maleic or fumaric acid to complete, i.e., to obtain a yield of about 100% of the polyaspartic ester. Neither patent addresses the issue of developing a process that makes a 100% yield of a mixture of (1) a polyaspartic ester based on a polypropylene oxide amine and (2) a polyaspartic ester based on an acyclic amine in a matter of days.

Unfortunately, such methods have prevented manufacturers of polyaspartic esters from delivering shipments to customers as quickly as would be desired. I have discovered that by following the teachings of the above-described known methods and using a 1:1 stoicheometric ratio, it takes several months to obtain full, or near-full, conversion of the reaction of a polypropylene oxide amine and an ester of maleic or fumaric acid. For instance, the use of bis (4-aminocyclohexyl)methane requires the polyaspartic ester to be stored in excess of six weeks to achieve 95% reaction and from six to twelve months to achieve complete reaction; and the use of bis (3-methyl-4-aminocyclohexyl)methane [commercially known as Laromin C-260] requires the polyaspartic ester to be stored in excess of eight weeks to achieve 95% reaction and from twelve to eighteen months to achieve 100% reaction. Removing excess ester of maleic or fumaric acid, as suggested by U.S. Pat. Nos. 5,236,741 and 5,623,045, is a time-consuming expensive procedure.

The problem of long waiting times has not been able to be resolved by making large amounts of the mixtures in advance because it is extremely difficult to predict customers' needs for the mixtures. Further, expensive storage, and inventory costs have discouraged the making and the storing of large amounts of the mixtures. As such, it is not uncommon for a customer to have to wait several months to receive an order of mixtures of polyaspartic esters.

It would be advantageous to develop an improved method for making mixtures of polyaspartic esters based on polypropylene oxide amines and polyaspartic esters based on acyclic amines that overcomes the above-named disadvantages.

SUMMARY OF THE INVENTION

The invention relates to a method for making a polyaspartic ester mixture in-situ comprising the sequential steps of (a) reacting a polypropylene oxide amine with an excess amount of an ester of fumaric or maleic acid to form a mixture containing first polyaspartic ester component and excess unreacted ester of fumaric or maleic acid, and (b) adding an acyclic amine to the mixture resulting from step (a) and reacting the acyclic amine with the excess ester of fumaric or maleic acid to form a second polyaspartic ester component. The invention is also directed to the in-situ mixture of polyaspartic ester esters formed during the method, prior to termination of the process, that contains the first polyaspartic ester component and the second polyaspartic ester component. The method makes it possible for customers to receive mixtures of the polyaspartic esters in a fraction of the time it has ordinarily taken. These and other features, aspects, and advantages of the present invention will become better understood with reference to the following description and appended claims.

DETAILED DESCRIPTION OF THE INVENTION

As used in this application, the term "acyclic amine" refers to an amine that does not have (i) a polypropylene oxide group and (ii) a primary amine group attached to a cyclic group.

The invention is based on the discovery that mixtures of polyaspartic esters based on polypropylene oxide amines and polyaspartic esters based on acyclic amines can be prepared in-situ, (under certain conditions) in a fraction of the time it ordinarily takes to make them. It is critical that the polypropylene oxide amine first react with an excess ester of maleic or fumaric acid. As discussed below, if the sequence of the steps varies, e.g., if the steps are reversed or if the cyclic and acyclic amines are added simultaneously, the reaction proceeds substantially slower and is outside the scope of the present invention.

The first and second ester components are selected from esters of maleic acid and fumaric acid. Esters of maleic acid and fumaric acid include suitable dialkyl maleates or dialkyl fumarates. Suitable dialkyl maleates include, diethyl maleate, dipropyl maleate, dibutyl maleate, methyl propyl maleate, ethyl propyl maleate, and the like. Suitable dialkyl fumurates include, diethyl fumurate, dipropyl fumurate, dibutyl fumurate, methyl propyl fumurate, ethyl propyl fumurate, and the like. Generally, dimethyl maleate or dimethyl fumurate is not used in an appreciable amount because it has been discovered that these esters cause the precipitation of long needle-like crystals that no longer participate in the Michael Addition Reaction and that cause the reaction to stop altogether. It is believed that cinnamate esters do not react under the same reaction conditions as esters of maleic acid or fumaric acid.

The amine component is generally selected from difunctional or trifunctional cyclic and acyclic amines that can accomplish the objects of the invention. Suitable amines can be selected from the following. Suitable acyclic difunctional amines include but are not limited to ethylene diamine, 1,2-diaminopropane, 1,4-diaminobutane, 1,6-diaminohexane, 2,5-dimethylhexane, 2,2,4- and/or 2,4,4-trimethyl-1,6-diaminohexane, 1,11-diaminoundecane, 1,12-diaminododecane, 1-amino-3,3,5-trimethyl-5-aminomethylcyclohexane, 2,4- and/or 2,6-hexahydrotolylenediamine, 2,4'- and/or 4,4'-diaminodicyclohexylmethane, and 3,3'-dimethyl-4,4'-diaminodicyclohexylmethane. Suitable trifunctional amines include 4-aminomethyl-1,8-diaminooctane (also known as triaminononane supplied by Monsanto Company), tris-(2-aminoethyl)amine. It is believed that tetrafunctional amines, e.g., N,N,N',N'-tetrakis-(2-aminoethyl)-1,2-ethanediamine are also suitable.

Suitable polypropylene oxide amines generally include difunctional and multifunctional amines with polypropylene oxide groups. These amines are well known and can be prepared by methods such as those described in German Offenlegungsschrift No. 1,193,671, U.S. Pat. No. 3,236,895, French. Pat. No. 1,466,708, all incorporated herein by reference in entirety. Suitable examples of such difunctional amines include polypropylene oxide diamine can be obtained from Huntsman Corporation under the marks Jeffamine D-2000. Examples of suitable trifunctional polypropylene oxide amines include polyoxypropylene triamine, (Jeffamine T-403), Jeffamine T-3000 and Jeffamine T-5000, also available from Huntsman.

The polyisocyanate component used to react with the polyaspartic ester mixtures includes any polyisocyanate, which when used in accordance with the invention, meets the object of the invention. Suitable polyisocyanates for use as polyisocyanate component in accordance with the present invention include the known polyisocyanates of polyurethane chemistry. Examples of suitable low molecular weight polyisocyanates having a molecular weight of 168 to 300 include 1,4-diisocyanatobutane, 1,6-hexamethylene diisocyanate, 2,2,4- and/or 2,4,4-trimethyl-1,6-hexamethylene diisocyanate, dodecamethylene diisocyanate, 1,4-diisocyanatocyclohexane, 1-isocyanato-3,3,5-trimethyl-5-isocyana-tomethylcyclohexane (IPDI), 2,4'- and/or 4,4'-diisocyanato-dicyclohexyl methane, 2,4- and/or 4,4'-diisocyanatodiphenyl methane and mixtures of these isomers with their higher homologues that are obtained in a known manner by the phosgenation of aniline/formaldehyde condenses, 2,4- and/or 2,6-diisocyanatotoluene and any mixtures of these compounds. Preferred cyclic isocyanates include diphenylmethane 4,4'-diisocyanate (MDI), diphenylmethane 2,4'-diisocyanate, 2,4- and/or 2,6-diisocyanatotoluene. Preferred aliphatic isocyanates include hexamethylene diisocyanate, isophorone diisocyanate, 2,4'- and/or 4,4'-diisocyanato-dicyclohexyl methane.

Additional suitable polyisocyanate components include derivatives of the above-mentioned monomeric polyisocyanates, as is conventional in coatings technology. These derivatives include polyisocyanates containing biuret groups as described, for example, in U.S. Pat. Nos. 3,124,605 and 3,201,372 and DE-OS 1,101,394, incorporated herein by reference in their entirety; polyisocyanates containing isocyanurate groups as described in U.S. Pat. No. 3,001,973, DE-PS 1,022,789, 1,222,067 and 1,027,394 and DE-OS 1,929,034 and 2,004,048, incorporated herein by reference in their entirety; polyisocyanates containing urethane groups as described, for instance, in DE-OS 953,012, BE-PS 752,261 and U.S. Pat. Nos. 3,394,164 and 3,644,457; polyisocyanates containing carbodiimide groups as described in DE-PS 1,092,007, U.S. Pat. No. 3,152,162 and DE-OS 2,504,400, 2,537,685 and 2,552,350, incorporated herein by reference in their entirety; and polyisocyanates containing allophanate groups as described, for example, in GB-PS 994,890, BE-PS 761,626 and NL-OS 7,102,524. Suitable polyisocyanates also include polyisocyanates that contain uretdione groups. In one embodiment, asymmetric trimers such as those in U.S. Pat. No. 5,717,091, incorporated herein by reference in its entirety. Isocyanate group-containing prepolymers and semi-prepolymers based on polyisocyanates can also be used as the polyisocyanate component. These prepolymers and semi-prepolymers generally have an isocyanate content ranging from about 0.5 to 30% by weight, preferably about 1 to 20% by weight, and are prepared in a known manner by the reaction of starting materials, e.g., isocyanate-reactive compounds such as polyols, at an NCO/OH equivalent ratio of about 1.05:1 to 10:1, preferably about 1.1:1 to 3:1.

The first step of the process involves reacting a polypropylene oxide amine with an excess amount of an ester of fumaric or maleic acid to form a mixture containing first polyaspartic ester component and excess unreacted ester of fumaric or maleic acid. The equivalent ratio of the ester of maleic or fumaric acid to the propylene oxide amine is greater than 1:1, preferably 1.2:1 to 5:1 and more preferably 1.4:1 to 3:1. Generally, the more excess ester of maleic or fumaric acid used, the faster the initial reaction proceeds. To obtain a yield that is about 100% at an equivalent ratio of ester of maleic or fumaric acid to polypropylene oxide amine of 2:1, for instance, the reaction lasts less than 24 hours. When the equivalent ratio of ester of maleic or fumaric acid to polypropylene oxide amine of 5:1, for instance, the reaction lasts less than 8 hours. It is generally preferred to have the initial reaction to be complete in about eight hours. Actual ratios for a specific application can be determined by routine experimentation.

The second step of the process involves adding an acyclic amine to the mixture and reacting the acyclic amine with the excess ester of fumaric or maleic acid to form a second polyaspartic ester component. The acyclic amine is preferably used in an amount that corresponds to the excess, unreacted ester of fumaric or maleic acid. Accordingly, the equivalent ratio of acyclic amine to cyclic amine is preferably 0.2:1 to 4:1, preferably 0.4:1 to 2:1. The reaction of the excess ester of maleic or fumaric acid and the acyclic amine generally takes less than two weeks.

The reaction conditions at which the method is carried out under are discussed below. Generally, the reaction takes place at a temperature of 0 to 100° C. The reaction may take place in the absence or in the presence of suitable solvents such as methanol, ethanol, propanol, ethyl- or butyl acetate and mixtures of these solvents. The pressure of the reaction is generally atmospheric. As such, since the reaction of the cyclic polyamine and the ester of maleic or fumaric acid lasts hours instead of months, conversions of about 100% of mixtures of the polyaspartic ester based on the polypropylene oxide amine and the polyaspartic ester based on the acyclic amine can be obtained in days instead of months. Generally, a conversion of about 100% is obtained in less than 2–3 days.

The polyaspartic ester mixtures can be used in applications such as coatings. The low viscosity allows the formulation of paint at high or very high solids, or even paint with no solvent. Coatings applications can use polyurea coatings based on polyaspartic esters and polyisocyanates include general factory applied coating and field applied architectural or automotive refinish coatings.

The invention will now be described in the following illustrative examples. All percentages given are by weight unless otherwise indicated.

EXAMPLE 1

A round bottom flask was fitted with stirrer, thermocouple, addition funnel and nitrogen inlet. 48.6 g (0.048 eq) Jeffamine D-2000 (polypropylene oxide diamine), equivalent weight 1000 available from Huntsman) was admitted to the flask and maintained at 25° C. with an ice bath. 152.7 (0.887 eq) diethyl maleate was admitted to the flask via the addition funnel over a two hour period. A cooling bath was used to maintain the reaction temperature at 25° C. At the end of the addition, the temperature of the reaction mixture was raised to 60° C. and held there for an additional one and one half hours. The unsaturation number was 47.7 mg maleic acid per gram of resin, which indicated 100% of the Jeffamine D-2000 had been converted to aspartate. 48.6 g (0.838 eq) 1,6-hexane-diamine (HDA) was added to the reaction over a one and one half hour period. At that time the unsaturation number was 4.88, which indicated the reaction was 90% complete. The reaction mixture was decanted to a jar that was stored at ambient conditions.

To determine the extent of the reaction, the unsaturation number was determined by the following thiol-iodine titrametric method. This method titrates all double bonds so that the sum of both maleic and fumaric esters is included in the resultant unsaturation number. The units of unsaturation number is given in terms of milligrams maleic acid per gram of resin. Twenty-four hours later the unsaturation number was 0.66, which indicated the reaction was 98% complete.

The thiol-iodine titrametric method involved the following steps: (1) dissolving a sample in 10 ml pyridine in 100 ml flask, (2) adding 5 drops 1% solution of phenothalein indicator in ethanol, (3) dispensing 8 ml 1 N solution of 1-dodecanethiol in ethanol, (4) titrating with 0.5 N solution of sodium hydroxide in ethanol until deep purple color is achieved. (The timer was started for exactly two minutes at first contact of NaOH/ethanol solution), (5) adding 2 ml glacial acetic acid after two minutes, (6) adding 60 ml ethanol, (7) titrating with 0.1 N iodine aqueous solution until a persistent yellow color was observed, and (8) running blank with every set of titrations, and (9) calculating the maleic acid number. A nitrogen blanket was provided for steps 2 through 4.

Calculations were made in accordance to the following formula:

$$\text{maleic acid number} = \frac{(\text{blank volume} - \text{sample volume})1.161}{\text{sample weight}}$$
$$(\text{mg per g resin})$$

EXAMPLE 2

The procedure of Example 1 was followed except that 100.2 g (0.100 eq) of a difunctional polypropylene oxide diamine (Jeffamine D-2000, equivalent weight 1000 available from Huntsman) was admitted to the flask and maintained at 25° C. with an ice bath. 116.4 (0.676 eq) diethyl maleate was admitted to the flask via the addition funnel over a two hour period. A cooling bath was used to maintain the reaction temperature at 25° C. At the end of the addition, the temperature of the reaction mixture was raised to 60° C. and held there for an additional three and one half hours. The unsaturation number was 32.0 mg maleic acid per gram of resin, which indicated 79% of the Jeffamine D-2000 had been converted to aspartate. The reaction was heated at 60° C. for an additional 140 hours. The unsaturation number was 30.5 mg maleic acid per gram of resin, which indicated 100% of the Jeffamine D-2000 had been converted to aspartate.

33.4 g (0.576 eq) 1,6-hexanediamine (HDA) was added to the reaction over a one and one half hour period. The reaction was heated for an additional two hours. At that time the unsaturation number was 4.88, which indicated the reaction was 89.9% complete. The reaction mixture was decanted to a jar that was stored at ambient conditions. Twenty-four hours later the unsaturation number was 0.4, which indicated the reaction was 99% complete.

COMPARATIVE EXAMPLE A

This example shows that mixtures of polyaspartic esters were not obtained in accordance with the invention when polypropylene oxide diamine was not reacted in an excess of diethyl maleate. A round bottom flask was fitted with stirrer, thermocouple, addition funnel and nitrogen inlet. 853.1 g (0.853 eq.) Jeffamine D-2000 (polypropylene oxide diamine, equivalent weight 1000 available from Huntsman) was admitted to the flask. 146.9 g (0.853 eq.) diethyl maleate was admitted to the flask via the addition funnel over a two hour period. The temperature of the reaction mixture rose to 60° C. as a result of a reaction exotherm. The reaction was held at 60° C. for an additional four and one half hours. The unsaturation number was 5.06 mg maleic acid per gram of resin, which indicated 48% of the Jeffamine D-2000 had been converted to aspartate. After 21 days the unsaturation number was 3.75, which indicated 62% reaction; and after 73 days the unsaturation number was 2.18, which indicated 78% reaction.

COMPARATIVE EXAMPLE B

This example shows the substantially slower conversion rate of polyaspartic ester mixtures that was observed when 1 eq:eq. Jeffamine 2000 and HDA was concurrently mixed. A round bottom flask was fitted with stirrer, thermocouple, addition funnel and nitrogen inlet. 48.6 g (0.049 eq) Jeffamine D-2000 (polypropylene oxide diamine, equivalent weight 1000 available from Huntsman) and 48.6 g (0.838 eq) 1,6-hexanediamine was admitted to the flask and mixed for five minutes. 152.7 g (0.887 eq) diethyl maleate was admitted to the flask via the addition funnel over a two and one-half hour period. The temperature of the reaction mixture rose to 60° C. as a result of a reaction exotherm. The reaction was held at 60° C. for an additional three hours. The unsaturation number was 3.52 mg maleic acid per gram of resin, which indicated 91.4% of the maleate had been converted to aspartate. If it is assumed that 90% of the hexanediamine had been converted, this means that only 67% of the Jeffamine 2000 had been converted. After 17 days the unsaturation number was 0.63, which indicated 98% of the maleate had been converted to aspartate. If it is assumed that 100% of the hexanediamine had been converted, this means that only 63% of the Jeffamine 2000 had been converted after 17 days.

COMPARATIVE EXAMPLE C

This example also shows the substantially slower conversion rate of polyaspartic ester mixtures observed when 1 eq:eq Jeffamine 2000 and HDA was concurrently mixed. A round bottom flask was fitted with stirrer, thermocouple, addition funnel and nitrogen inlet. 100.2 g (0.100 eq) Jeffamine D-2000 (polypropylene oxide diamine, equivalent weight 1000 available from Huntsman) and 33.4 g (0.576 eq) 1,6-hexanediamine was admitted to the flask and mixed for five minutes. 116.4 g (0.676 eq) diethyl maleate was admitted to the flask via the addition funnel over a one hour period. The temperature of the reaction mixture rose to 60° C. as a result of a reaction exotherm. The reaction was held at 60° C. for an additional five and one half hours. The unsaturation number was 5.02 mg maleic acid per gram of resin, which indicated 84.0% of the maleate had been converted to aspartate. If it is assumed that 90% of the hexanediamine had been converted, this means that only 49% of the Jeffamine 2000 had been converted. After 17 days the unsaturation number was 1.59, which indicated 94% of the maleate had been converted to aspartate. If it is assumed that 100% of the hexanediamine had been converted, this means that only 66% of the Jeffamine 2000 had been converted after 17 days.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A method for making a polyaspartic ester mixture in-situ comprising the sequential steps of:
   (a) reacting a polypropylene oxide amine with an excess amount of an ester of fumaric or maleic acid to form a mixture containing a first polyaspartic ester component and excess unreacted ester of fumaric or maleic acid, and
   (b) adding an acyclic amine to the mixture resulting from step (a) in an amount sufficient to react the acyclic amine with the excess ester of fumaric or maleic acid and to form a second polyaspartic ester component.

2. The method of claim 1, wherein the polypropylene oxide amine comprises a component selected from the group consisting of polypropylene oxide diamine and polyoxypropylene triamine.

3. The method of claim 1, wherein the acyclic amine comprises a component selected from the group consisting of ethylene diamine, 1,2-diaminopropane, 1,4-diaminobutane, 1,6-diaminohexane, 2-methyl-1,5-diaminopentane, 2,5-diamino-2,5-dimethylhexane, 2,2,4-trimethyl-1,6-diaminohexane, 2,4,4-trimethyl-1,6-diaminohexane, 1,11-diaminoundecane, and 1,1,2-diaminododecane.

4. The method of claim 1, wherein the ester of fumaric or maleic acid comprises an ester selected from the group consisting of diethyl maleate, dipropyl maleate, dibutyl maleate, methyl propyl maleate, ethyl propyl maleate, diethyl fumarate, dipropyl fumarate, dibutyl fumarate, methyl propyl fumarate, and ethyl propyl fumarate.

5. The method of claim 1, wherein the number ratio of the polypropylene oxide amine to the ester of fumaric or maleic acid is at least 2:1.

6. The method of claim 1, wherein the number ratio of the polypropylene oxide amine to the ester of fumaric or maleic acid is from about 20:1 to about 2:1.

7. The method of claim 1, wherein a conversion of about 100% of the first and second polyaspartic ester components is obtained in less than 3 days.

8. The method of claim 1, wherein a conversion of about 100% of the first and second polyaspartic ester components is obtained in less than 2 days.

9. A method for making a polyaspartic ester mixture in-situ comprising the sequential steps of:
   (a) reacting a polypropylene oxide amine with an ester of fumaric or maleic acid to form a mixture containing a first polyaspartic ester component and excess unreacted ester of fumaric or maleic acid, wherein the number ratio of the polypropylene oxide amine to the ester of fumaric or maleic acid is at least 2:1 and
   (b) adding an acyclic amine to the mixture resulting from step (a) and reacting the acyclic amine with the excess ester of fumaric or maleic acid to form a second polyaspartic ester component, wherein a conversion of about 100% of the first and second polyaspartic ester components is obtained in less than 20 days.

10. The method of claim 9, wherein the polypropylene oxide amine comprises a component selected from the group consisting of polypropylene oxide diamine and polyoxypropylene triamine.

11. The method of claim 9, wherein the acyclic amine comprises a component selected from the group consisting of ethylene diamine, 1,2-diaminopropane, 1,4-diaminobutane, 1,6-diaminohexane, 2-methyl-1,5-diaminopentane, 2,5-diamino-2,5-dimethylhexane, 2,2,4-trimethyl-1,6-diaminohexane, 2,4,4-trimethyl-1,6-diaminohexane, 1,11-diaminoundecane, and 1,1,2-diaminododecane.

12. The method of claim 9, wherein the ester of fumaric or maleic acid comprises an ester selected from the group consisting of diethyl maleate, dipropyl maleate, dibutyl maleate, methyl propyl maleate, ethyl propyl maleate, diethyl fumarate, dipropyl fumarate, dibutyl fumarate, methyl propyl fumarate, and ethyl propyl fumarate.

13. The method of claim 9, wherein the number ratio of the polypropylene oxide amine to the ester of fumaric or maleic acid is at least 2:1.

14. The method of claim 9, wherein the number ratio of the polypropylene oxide amine to the ester of fumaric or maleic acid is from about 20:1 to about 2:1.

15. The method of claim 9, wherein a conversion of about 100% of the first and second polyaspartic ester components is obtained in less than 3 days.

16. The method of claim 9, wherein a conversion of about 100% of the first and second polyaspartic ester components is obtained in less than 2 days.

* * * * *